Patented June 17, 1952

2,600,456

UNITED STATES PATENT OFFICE 2,600,456

PROMOTION OF DITHIONATE ION FORMATION IN LEACHING OXIDIC MANGANESE ORES WITH SULFUR DIOXIDE SOLUTIONS

Wallace F. Wyman, deceased, late of Salt Lake City, Utah, by Wallace J. Wyman, administrator, Waseca, Minn., and Alexander E. Back, Salt Lake City, Utah, assignors to the United States of America as represented by the Secretary of the Interior No Drawing. Application December 30, 1948, Serial No. 68,382

4 Claims. (Cl. 23—115)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (ch. 460, 45 Stat. L. 467).

This invention relates to the reactions of the system manganese dioxide-sulfur dioxide-water-oxygen. Particularly the invention relates to a method for catalytically controlling the reactions of this system so as to increase the rate of dithionate ion formation.

The dithionate process for the recovery of manganese from low-grade ores has been described by Ravitz, Wyman, Back, and Tame in Technical Publication No. 2064 of the American Institute of Mining and Metallurgical Engineers (Class D, Metals Technology, September 1946), and also in the patent application of F. S. Wartman and Wallace F. Wyman, Serial No. 744,532, filed April 28, 1947, now abandoned. The dithionate process utilizes the following reactions of the system manganese dioxide-sulfur dioxide-water-oxygen:

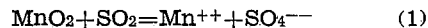  (1)
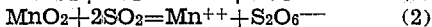  (2)
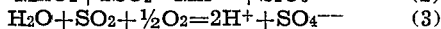  (3)
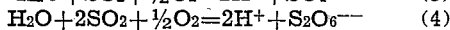  (4)

$$MnO_2 + SO_2 = Mn^{++} + SO_4^{--} \quad (1)$$
$$MnO_2 + 2SO_2 = Mn^{++} + S_2O_6^{--} \quad (2)$$
$$H_2O + SO_2 + \tfrac{1}{2}O_2 = 2H^+ + SO_4^{--} \quad (3)$$
$$H_2O + 2SO_2 + \tfrac{1}{2}O_2 = 2H^+ + S_2O_6^{--} \quad (4)$$

In the process, a slurry of the oxidic manganese ore in an excess of calcium dithionate solution is treated with gas containing sulfur dioxide and oxygen. Manganese sulfate, manganese dithionate, sulfuric acid, and dithionic acid are formed in the above reactions. The sulfate ion formed by reactions (1) and (3) is immediately precipitated as calcium sulfate by reaction with the suspending calcium dithionate solution:

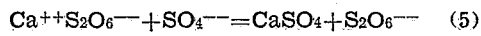  (5)

$$Ca^{++} + S_2O_6^{--} + SO_4^{--} = CaSO_4 + S_2O_6^{--} \quad (5)$$

The intermediate oxides $Mn_2O_3$ and $Mn_3O_4$, which may be present in the ore, behave largely as though they were mixtures of $MnO_2$ and $MnO$, the latter being dissolved by the acid formed in reactions (3) and (4)

$$MnO + 2H^+ = Mn^{++} + H_2O \quad (6)$$

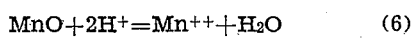

At the end of the leaching process the solids, which consist of the insoluble portion of the ore and the precipitated calcium sulfate, are separated from the solution and discarded (or treated further if they contain appreciable quantities of lead, gold, or silver). The solution which contains manganese dithionate, a small quantity of dithionic acid, and the excess of calcium dithionate, is treated with slaked lime to precipitate manganese hydroxide and regenerate the calcium dithionate:

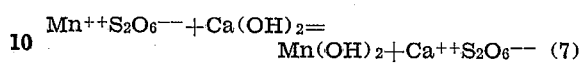

$$Mn^{++} + S_2O_6^{--} + Ca(OH)_2 = Mn(OH)_2 + Ca^{++} + S_2O_6^{--} \quad (7)$$

The precipitate is filtered off and nodulized or sintered to produce manganese oxide, and the calcium dithionate solution is recycled. The dithionate losses are those due to incomplete washing of the leach residue and the manganese hydroxide precipitate. To maintain the dithionate concentration in the circuit, the quantity of dithionate formed by reactions (2) and (4) should at least be equal to such losses. Therefore it is highly desirable to be able to control the rate of dithionate formation. In the aforementioned Wartman and Wyman application, the rate of formation of sulfate, dithionate, and acid is controlled in the system manganese dioxide-sulfur dioxide-water-oxygen by controlling at least one of the following conditions: the ratio of oxygen to sulfur dioxide in the gaseous treating mixture; the depth of the ore pulp being treated; and the bubble size of the gaseous treating mixture.

While the varying of these reaction conditions has been found to be effective in controlling the rate of dithionate, acid, and sulfate formation, it is felt that a more simplified technique to accomplish this function would be more desirable.

Accordingly, it is an object of this invention to devise a simplified process for the control of the rate of formation of dithionate, sulfate, and acid in the system manganese dioxide-sulfur dioxide-water-oxygen. It is another object to present an improved dithionate process for the recovery of manganese from low-grade manganese ores.

Other objects and advantages will be apparent or will appear hereinafter.

These objects and advantages are accomplished in accordance with this invention wherein petroleum fractions are employed to catalyze the reactions of the manganese dioxide-water-sulfur dioxide-oxygen system whereby the rate of dithionate formation is increased.

In the discussion to follow the system manganese dioxide-water-sulfur dioxide-oxygen is not to be construed as being limited to the quaternary system recited. Other materials can be present for example: the manganese dioxide can be present as an impure manganese ore containing manganese dioxide along with the various matrix materials; the water can also be a solution such as the alkali earth metal dithionate solution used in the cyclic dithionate process; the sulfur dioxide can be waste smelter gases or other mixtures containing $SO_2$; and the oxygen can be supplied as air or other mixtures containing elemental oxygen.

Suitable petroleum fractions for use as catalysts in accordance with this invention include the pure hydrocarbons separable from petroleum such as dodecane, tetralin, n-butyl cyclohexane, and the like; and mixtures thereof such as heavy lubricating oil, kerosene, gasoline, fuel oil, hydraulic oil, light machine oil, and the like.

These petroleum fractions can be employed in any suitable manner either in pure form or when combined with a suitable emulsifying or dispersing agent. Since the use of emulsifying agents and the like appear to permit a more uniform dispersion of the petroleum fraction throughout the reaction mixture and thereby permit the use of smaller quantities of the catalyst, it is presently preferred to employ an emulsifying agent along with the petroleum fraction. The following emulsifying agents summarize in part those which have been found satisfactory in this connection but the process is not to be considered as limited thereto; soaps, a sulfated monoglyceride of coconut oil derivation ("Syntex M"), the ammonium salt of lauryl diethylene glycol sulfate ("Emulsol X-1"), sodium isopropyl naphthylene sulfonate ("Aerosol OS") sodium oleate, and the like.

In operation the petroleum fraction is dispersed throughout the manganese dioxide-water slurry or pulp. When added in pure form between about 1 to 40 pounds of the catalyst per ton of manganese ore has been found to function satisfactorily. Although greater or lesser quantities will be found operable, depending to some extent on other conditions of the process as shown in the Wartman and Wyman application.

The catalyst can also be added as an emulsion and, when so added, the emulsion can be readily prepared by known methods using sufficient emulsifying reagent and water to prepare an emulsion that can be readily dispersed throughout the ore-water pulp. In such instances between about 0.01 to 1 pound of catalyst per ton of manganese ore have been found to be effective; but while these quantities, too, have been found capable of being varied within much wider limits, economic factors will be found to be sound limitation.

The following examples will show how the invention may be carried out but it is not limited thereto. In these examples a laboratory leaching apparatus was constructed to permit sulfur dioxide leaching of samples of manganese ore under reproducible conditions. The geometrical position of all the apparatus in the cell was fixed; the agitator speed was held constant at $495 \pm 5$ R. P. M.; the gas inlet was made from 10 mm. (O. D.) glass tubing placed so that the gas was discharged in the direction that the agitator turned and at a point $\frac{1}{8}$ inch above the agitator blade and $1\frac{3}{16}$ inches from the agitator shaft; the slurry depth was $5\frac{1}{4}$ inches; the gas rates were held constant with the aid of valves and flowmeters at 0.08 pound of sulfur dioxide per hour and $15.6 \pm 0.2$ cubic feet of air per hour, respectively; and the temperature was held constant at $35 \pm 0.50$ centigrade. Two-hour leaching tests were made under the above standardized conditions. In each test 1.14 grams of sulfur dioxide was introduced per gram of manganese introduced. Similar ore samples were obtained by riffling all the samples from the same well mixed minus 65-mesh lot. The manganese was present as pyrolusite, psilomelane, manganite, braunite, and wad, and had the following composition:

TABLE 1

| Mn | Zn | Fe | Cu | CaO | MgO | $Al_2O_3$ | Insol | Oz. per ton | |
|---|---|---|---|---|---|---|---|---|---|
| | | | | | | | | Au | Ag |
| Per cent 15.2 | Per cent 1.25 | Per cent 1.55 | Per cent 0.12 | Per cent 0.15 | Per cent 0.2 | Per cent 2.1 | Per cent 67.6 | 0.005 | 11.3 |

EXAMPLE I

Using the leaching cell, or sample, and procedure described in the preceding paragraphs, tests were made as to the effect of adding kerosene (40 pounds per ton of ore) to the ore slurry, and these results were compared with test runs in which no catalysts were added. The results are summarized in part in Table 2 below.

TABLE 2

*The effect of kerosene on dithionate formation*

| Catalyst | Per cent Conversion of absorbed $SO_2$ to $S_2O_6$ | Final pH | grams $S_2O_6$ formed during test |
|---|---|---|---|
| None | 14.0 | 1.89 | 9.7 |
| None | 14.4 | 1.88 | 10.5 |
| None | 14.2 | 1.88 | 10.6 |
| Kerosene (40 lbs./T ore) | 51.8 | 3.0 | 39.2 |

The tests wherein no catalyst was used show that the results can be duplicated closely; while the test in which kerosene was used as a catalyst shows the pronounced effect of the kerosene in increasing the formation of dithionate and decreasing the acidity (increasing the final pH), the absorbed $SO_2$ not converted to dithionate was converted to sulfate.

EXAMPLE II

Comparable tests were carried out employing other petroleum fractions as catalysts. The data from these tests are compared with the standard runs without a catalyst in Example I. The results are in part summarized in Table 3 below.

TABLE 3

*Laboratory leaching tests wherein petroleum fractions not emulsified were used*

| Catalyst | Lb. catalyst per ton of ore | Percent of the values obtained in the standard leaches | | | | Final pH deviation from standard pH units |
|---|---|---|---|---|---|---|
| | | Mn extraction | S utilization | Weight ratio $S_2O_6^=$/$Mn^{++}$ | Conversion of absorbed $SO_2^=$ | |
| Gasoline | 40 | 92 | 102 | 373 | 318 | +0.9 |
| Kerosene | 4 | 99 | 96 | 108 | 107 | +0.3 |
| | 40 | 87 | 103 | 439 | 265 | +1.1 |
| Fuel oil | 1 | 101 | 100 | 122 | 121 | 0.0 |
| | 4 | 100 | 110 | 227 | 204 | +1.0 |
| | 4 | 98 | 105 | 238 | 219 | +1.0 |
| | 12 | 92 | 99 | 276 | 251 | +1.1 |
| | 40 | 93 | 109 | 297 | 251 | +1.1 |
| Hydraulic oil | 4 | 105 | 103 | 138 | 135 | +0.4 |
| | 40 | 101 | 106 | 178 | 171 | +0.6 |
| Machine oil | 4 | 108 | 105 | 127 | 127 | +0.3 |
| Heavy oil | 4 | 100 | 105 | 176 | 167 | +0.6 |
| | 40 | 80 | 88 | 366 | 323 | +1.7 |

EXAMPLE III

Further comparable tests were carried out using fuel oil as the catalyst, together with various emulsifying agents. The results are compared with those in Examples I and II, and are summarized in part in Table 4 below.

TABLE 4

*The effect of emulsifying the catalyst*

| Test No. | 1 | 2 | 3 | 4 | 5 | 6 |
|---|---|---|---|---|---|---|
| Pounds of fuel oil per ton of ore | 1 | 1 | 1 | 4 | 4 | 12 |
| Oil emulsified | No | Yes | Yes | No | Yes | No |
| Emulsion concentration, per cent | | | | | | |
| Fuel oil | | | 1.0 | | | |
| Emulsifier [1] | | None | 0.01 | | None | |
| Pounds of emulsifier per ton of ore | | None | 0.01 | | None | |
| Per cent of the values obtained in the standard leaching tests: | | | | | | |
| Mn extraction | 101 | 94 | 95 | 98 | 93 | 92 |
| S utilization | 100 | 105 | 104 | 105 | 103 | 99 |
| Weight ratio: $S_2O_6^=$/$Mn^{++}$ | 122 | 246 | 250 | 238 | 256 | 276 |
| Conversion of absorbed $SO_2$ to $S_2O_6^=$ | 121 | 220 | 220 | 219 | 232 | 251 |
| Final pH deviation from the standard, in pH units | 0.0 | +1.0 | +1.2 | +1.0 | +0.9 | +1.1 |

[1] The ammonium salt of lauryl diethylene glycol sulfate (Emulsol X-1).

The data of Table 4 show, in the case of fuel oil, that when the catalyst was emulsified high dithionate formation could be achieved with less catalyst than when the catalyst was not emulsified, and that an emulsifying agent could be used to give a stable emulsion without appreciably affecting the action of the catalyst. It is to be noted that the results with 1 pound of fuel oil per ton of ore, when the oil was emulsified, were nearly as good as those with 12 pounds per ton, when the oil was not emulsified.

Additional data on tests in which emulsified fuel oil was used are given in Table 5.

TABLE 5

*Laboratory leaches wherein emulsified fuel oil was used*

| Test No. | Emulsifier [1] | Emulsion concentration, per cent | | Lb. per ton of ore | | Per cent of values obtained in standard leaches | | | | Final pH deviation from standard, in pH units |
|---|---|---|---|---|---|---|---|---|---|---|
| | | Fuel oil | Emulsifier | Fuel oil | Emulsifier | Mn extraction | S utilization | Weight ratio $S_2O_6^=$/$Mn^{++}$ | Conversion of absorbed $SO_2$ to $S_2O_6^=$ | |
| 1 | Colgate's floating soap | 1 | 0.1 | 0.05 | 0.005 | 100 | 99 | 115 | 116 | +0.3 |
| 2 | do | 1 | 0.1 | 1 | 0.1 | 93 | 96 | 185 | 181 | +0.2 |
| 3 | Syntex M | 1 | 0.1 | 0.1 | .025 | 102 | 105 | 161 | 156 | |
| 4 | do | 1 | 0.1 | .25 | .025 | 94 | 98 | 208 | 199 | +1.0 |
| 5 | do | 1 | 0.1 | 1 | .1 | 102 | 106 | 172 | 166 | +0.5 |
| 6 | do | 1 | 0.1 | 1 | .1 | 100 | 106 | 192 | 181 | +0.7 |
| 7 | do | 1 | 0.1 | 1 | .1 | 99 | 109 | 210 | 191 | +0.9 |
| 8 | do | 1 | 0.1 | 1 | .1 | 97 | 103 | 192 | 182 | +0.8 |
| 9 | do | 1 | 0.1 | 1 | .1 | 100 | 105 | 180 | 173 | +0.5 |
| 10 | do | 1 | 0.1 | 1 | .1 | 99 | 102 | 199 | 191 | +1.0 |
| 11 | Emulsol X-1 | 1 | 0.1 | .0005 | .00005 | 101 | 99 | 93 | 94 | +0.1 |
| 12 | do | 1 | 0.1 | .0025 | .00025 | 101 | 102 | 121 | 121 | +0.2 |
| 13 | do | 1 | 0.1 | .01 | .001 | 100 | 104 | 151 | 146 | +0.4 |
| 14 | do | 1 | 0.1 | .05 | .005 | 99 | 102 | 200 | 193 | +0.9 |
| 15 | do | 1 | 0.1 | .25 | .025 | 97 | 102 | 207 | 195 | +1.2 |
| 16 | do | 1 | 0.1 | 1 | .1 | 99 | 98 | 167 | 169 | +1.1 |
| 17 | do | 1 | 0.1 | 1 | .1 | 99 | 101 | 173 | 169 | +1.0 |
| 18 | do | 10 | 0.1 | .1 | .001 | 98 | 100 | 190 | 185 | +0.7 |
| 19 | do | 10 | 0.1 | 1 | .01 | 93 | 98 | 232 | 221 | +1.5 |
| 20 | do | 10 | 0.1 | 4 | .04 | 93 | 98 | 234 | 222 | +1.5 |
| 21 | do | 10 | 0.01 | .1 | .0001 | 99 | 100 | 144 | 144 | +0.3 |
| 22 | do | 10 | 0.01 | 1 | .001 | 98 | 103 | 228 | 216 | +0.9 |
| 23 | do | 10 | 0.01 | 4 | .004 | 95 | 102 | 236 | 221 | +1.2 |
| 24 | do | 1 | 0.01 | .1 | .001 | 103 | 102 | 118 | 120 | +0.2 |
| 25 | do | 1 | 0.01 | .25 | .0025 | 102 | 99 | 113 | 116 | +0.2 |
| 26 | do | 1 | 0.01 | 1 | .01 | 95 | 104 | 250 | 232 | +1.2 |
| 27 | do | 1 | 0.01 | 2.4 | .024 | 94 | 101 | 248 | 230 | +1.2 |
| 28 | Emulsol tri-X | 1 | 0.1 | .05 | .005 | 98 | 103 | 208 | 199 | +0.9 |

[1] "Syntex M" is a trade name for a sulfated monoglyceride of coconut oil derivation, "Emulsol X-1" for the ammonium salt of lauryl diethylene glycol sulfate. The composition of Emulsol tri-X is not known.

From the foregoing description and examples, it is apparent that when the various petroleum fractions are employed as catalysts in the system manganese dioxide-sulfur-dioxide-water-oxygen, the rate of dithionate formation is increased and the rate of sulfate and acid formation is decreased.

It is desirable and advantageous to increase the formation of dithionate ion, particularly in commercial application of this invention. The factors inhibiting dithionate formation, particularly in a commercial size operation of the process of this invention, far out-weigh the factors promoting dithionate formation, and any catalyst which increases dithionate formation is an asset to the process. The reactions

are exothermic and an efficient cooling system is required to maintain the slurry temperature below 50° C. The successful operation of this process requires that sufficient dithionate be formed to offset washing losses and to give a pregnant solution relatively free from sulfate ion so that the final manganese product will not contain excess lime or sulfur from the coprecipitated gypsum.

Since many widely differing embodiments will be apparent to one skilled in the art, various changes can be made therein without departing from the spirit and scope thereof.

What is claimed is:

1. In a process for the recovery of manganese values from oxidic manganese ores comprising the steps of forming a slurry of manganese ore, treating said slurry with SO₂, separating the insoluble material from the solution, and precipitating manganese values from said solution, the improvement which consists in adding petroleum fractions so as to promote dithionate ion formation in the SO₂ reaction.

2. In a process for the recovery of manganese values from oxidic manganese ores comprising the steps of forming a slurry of manganese ore, treating said slurry with SO₂, separating the insoluble material from the solution, and precipitating manganese values from said solution, the improvement which consists of adding a mixture of petroleum fractions and an emulsifying agent so as to promote dithionate ion formation in the SO₂ reaction.

3. In a process for the recovery of manganese values from oxidic manganese ores comprising the steps of forming a slurry of manganese ore, treating said slurry with SO₂, separating the insoluble material from the solution, and precipitating manganese values from said solution, the improvement which consists of adding from one to forty pounds of a petroleum fraction per ton of manganese ore treated so as to promote dithionate ion formation in the SO₂ reaction.

4. In a process for the recovery of manganese values from oxidic manganese ores comprising the steps of forming a slurry of manganese ore, treating said slurry with SO₂, separating the insoluble material from the solution, and precipitating manganese values from said solution, the improvement which consists of adding a mixture of from one to forty pounds of a petroleum fraction and 0.01 to one pound of an emulsifying agent per ton of manganese ore treated so as to promote dithionate ion formation in the SO₂ reaction.

WALLACE J. WYMAN.
*Administrator of the Estate of Wallace F. Wyman, Deceased.*

ALEXANDER E. BACK.

REFERENCES CITED

The following references are of record in the file of this patent:

UNITED STATES PATENTS

| Number | Name | Date |
|---|---|---|
| 1,325,129 | Westling | Dec. 16, 1919 |

FOREIGN PATENTS

| Number | Country | Date |
|---|---|---|
| 51,258 | Sweden | June 21, 1920 |
| 28,865 | Denmark | Nov. 16, 1921 |

OTHER REFERENCES

Mellor, "Modern Inorganic Chemistry", pp. 456, 457. London, Longmans, Green & Co., 1920.